Patented Aug. 17, 1954

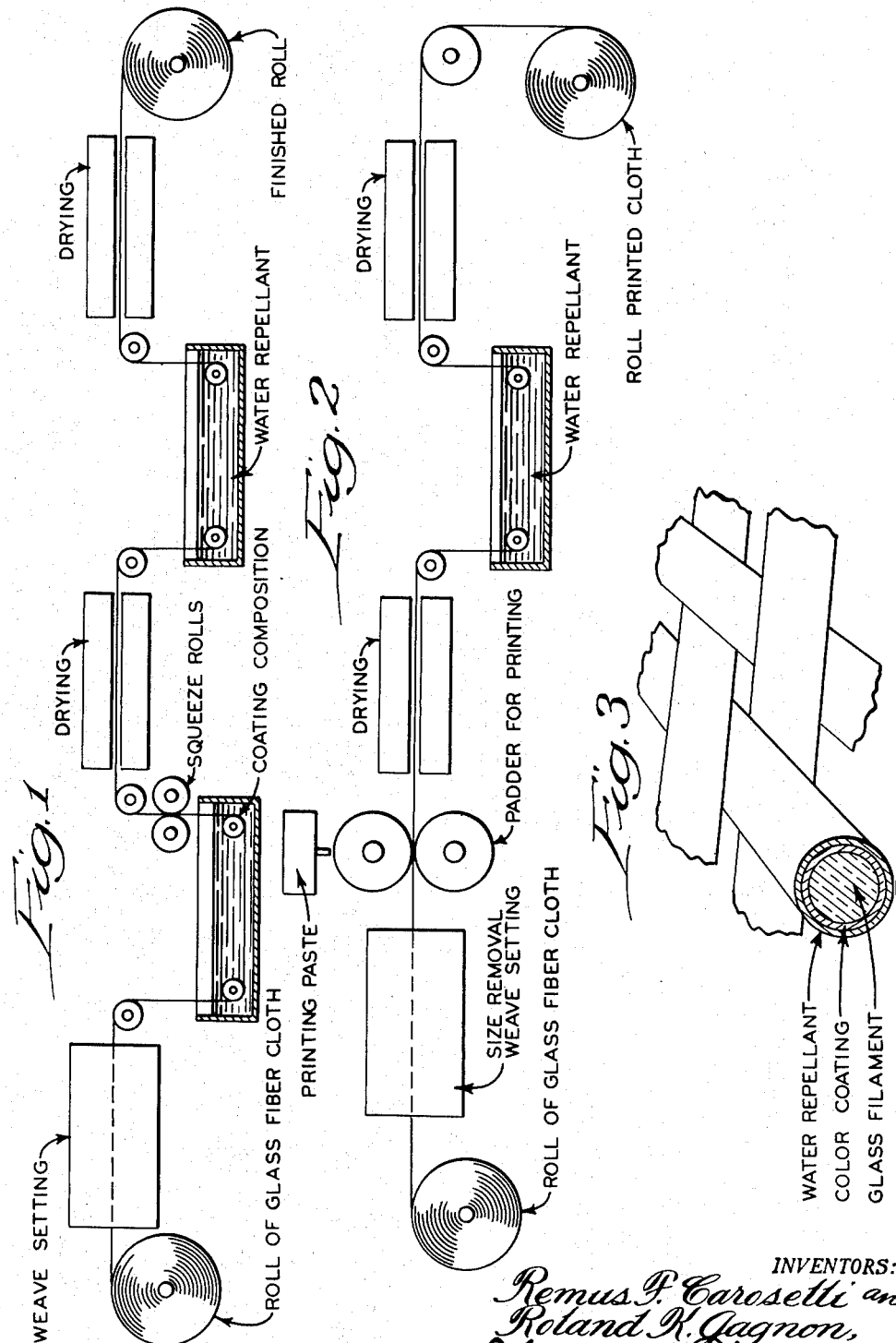

2,686,737

UNITED STATES PATENT OFFICE 2,686,737

METHOD OF COATING GLASS FABRIC WITH BUTADIENE - ACRYLONITRILE COPOLYMER AND ARTICLE PRODUCED THEREBY

Remus F. Caroselli and Roland K. Gagnon, Pawtucket, R. I., assignors to Owens-Corning Fiberglas Corporation, Toledo, Ohio, a corporation of Delaware Application June 3, 1950, Serial No. 166,012

12 Claims. (Cl. 117—54)

This invention relates to the treatment of glass fibers in the manufacture of plain or colored fabrics and the like.

It is an object of this invention to produce and to provide a method for producing plain and colored glass fibers, preferably in fabric form, which can be washed, cleaned and handled as any other fabric without loss of color, strength or any of its other desirable characteristics.

Another object is to produce and to provide a method for producing a printed or otherwise colored glass fiber fabric which is freely launderable, dry cleanable, water repellant, light fast, strong, abrasion resistant, wrinkleproof and silky, coupled with many of the other desirable characteristics inherent in a glass fiber fabric and it is a related object to achieve these same results in an uncolored fabric of glass fibers.

Full advantage has not been taken of the excellent physical and chemical properties of glass fibers in fabrics because of the high breakage of the fibers in mutual abrasion and because of the difficulty in permanently coloring the glass fibers, especially while they are in fabric form. Extensive research has taught that the hydrophilic characteristics predominant on the glass fiber surfaces coupled with the perfectly smooth walls of the attenuated glass filaments of which the glass fiber strands or yarns are formed makes it difficult to cause anything to adhere to the glass fiber surfaces which might serve as a protective coating and as a base for coloring material. This lack of adhesion becomes very apparent under high humidity conditions, such as exist while laundering. The intervening water film which forms on the hydrophilic glass fiber surfaces reduces any chemical bond which might have existed, and with the lack of a physical bond on the smooth glass fiber surfaces, any coating can almost be wiped or peeled off.

It has been found that glass fibers, whether or not they are in fabric form, may be provided with the desired protective coating and, at the same time, permanently colored if, after the fibers have been cleaned to remove the size, they are treated with a composition containing a tinctorial agent in combination with a butadiene-acrylonitrile copolymer, and then, after the colored coating has been set on the glass fiber surfaces, the fibers are treated with a highly receptive and adherent water repellent.

Removal of the size applied to the glass filaments in forming is not essential but the sucrose, gelatin or starchy and oleaginous materials of which the size for textile fibers are usually formed are best removed to develop maximum integration between the protective color coating and the glass fiber surfaces. The fibers may be cleaned by a water wash or by solvents, but it is preferred to burn the size from the glass fiber surfaces while at the same time employing a type of heat treatment of suitable intensity and duration substantially to set the fibers in the weave and to relax the fibers. Suffice it to say that the size may be burned off the fibers by prolonged heat treatment at 650° F. or more but for weave setting and fiber relaxation temperatures in the range of 900–1250° F. for 1 second to 30 minutes are employed depending on the weight of the fabric and the temperature. Conditions suitable for heat cleaning and weave setting are described in the pending application of Waggoner and Rowley, Serial No. 91,841, filed May 6, 1949. When the fabric treated in accordance with this invention has been heat cleaned in a manner to also effect weave setting, the final product has the characteristics of the finest silks or satins, that is it has good hand, excellent draping qualities, and is wrinkleproof and creaseproof in addition to considerable improvement in the characteristics previously described.

Suitable butadiene-acrylonitrile copolymers are formulated of 20–40 parts by weight acrylonitrile copolymerized with 80–60 parts by weight butadiene. Compositions of the type described are presently marketed under the trade names Hycar OR–25 and Hycar PA, manufactured by the B. F. Goodrich Chemical Rubber Company. The butadiene-acrylonitrile copolymer may be used in solution with such solvents as the coal tar hydrocarbons, esters or ketones, such as benzene, toluene, ethyl acetate, butyl acetate, butyl Cellosolve and methyl ethyl ketone. It is preferred, however, to employ the copolymer in an aqueous system such as in aqueous emulsion or water dispersion having a solids content of about 20–50 percent by weight solids. In the composition for treating the glass fibers, best practice calls for a copolymer content ranging from 2–25 percent by weight. If less is used, the resulting colored fabric crocks easily and if more is used, the fabric loses its softness and good feel but instead becomes heavy and stiff.

The amount and type of tinctorial agent depends chiefly on the system employed for the treating composition and the intensity of color desired in the fabric. In a solvent system, it is possible to use an organic dye which is capable of solution in the solvents employed. In an aqueous system, use is made of water soluble dyestuffs which may or may not be subsequently set as in the formaldehyde setting dyes or use may be made of water dispersible pigments. Representative of suitable tinctorial agents are the nitroso pigments such as Naphthol Green Y, and Naphthol Green B; nitro pigments such as Naphthol Yellow S, Pigment Chlorine GG and Lithol Fast Yellow GG; azo pigments such as Toluidene red, para reds, hansa yellows, permanent orange, benzidene yellows, Persian orange and Lithol red; pyrazolone pigments such as Hansa Yellow R; basic dye pigments such as Malachite Green, Crystal Violet, Auromine O, Auromine G, Setoglaucine, Brilliant Green, Magenta, Methyl Violet, Rhodamine B, Thioflavin T, Methylene Blue; auxanthine dye pigments, anthroquinone pigments, vat color pigments and phthalocyanine pigments such as indigo, Ciba Violet, Algal Yellow, Monastral Blue, Syrian Blue and the like.

The particular method for processing with these pigments and dyestuffs are clearly set forth for each in the coloring art and needs no detailed description here. The amount of pigment depends upon the type being used and the intensity of color to be developed. Ordinarily it is sufficient to employ from 1–20 percent concentration in the treating composition. When pigment dispersions are employed it is best to formulate the treating composition with from 0.1–1.0 percent by weight or more of a dispersing agent such as a rosin soap, metal soap, fatty acid amine soap or the like. In the event that a plain uncolored glass fiber fabric is desired having the properties of increased abrasion resistance and good strength and feel, the same treating composition may be used without a tinctorial agent.

After the coating composition has been applied to the glass fiber fabric as by a dip, flow coat, roller coat, padder or spray process or the like, and after the coating has been set on the glass fiber surfaces as by drying, preferably in the presence of heat ranging from 100–250° F. for accelerating the evaporation of diluent and integration of the coating on the glass fiber surfaces, the coated fibers are treated with a water repellent such as stearato-chromyl chloride or other Werner complex compound wherein the acido group coordinated with the basic chromium or like atom has more than 10 carbon atoms such as is described in the Iler Patents No. 2,273,040 and No. 2,356,161. In the treatment of the coated fibers, solutions of the water repellent in concentrations ranging from 0.2–3.0 percent by weight give best results. Mere drying with or without heat (150–250° F.) is sufficient to set the water repellent on the coated glass fiber surfaces such that the fibers readily shed water and the coating is not displaced from the glass fiber surfaces by a water film.

Instead of Werner complex compounds of the type described, other water repellent substances such as the cationic active compounds having more than 10 carbon atoms in the cationic group may be used in corresponding concentration. Suitable materials of the type described are disclosed in the patent to Sloan No. 2,356,542.

The described compositions are suitable for piece dyeing or for treating the fabric with a low viscosity composition. For printing on cleaned glass fiber fabric, the same coating composition may be formulated into a suitable printing paste by the addition of a water soluble bodying agent such as an alginate, methyl cellulose hydroxyethyl cellulose, or carboxymethyl cellulose. 2–5 percent by weight alginate is sufficient to give a desired body for a screen printing paste while amounts ranging from 3–15 percent of the cellulose derivatives are desirable depending upon the degree of esterification.

Although not equivalent, it has been found that corresponding improvement in a glass fiber fabric can be secured when, instead of the butadiene-acrylonitrile copolymer, an acrylic acid ester polymer, with or without plasticizer, is used such as methyl methacrylate, ethyl methacrylate, butyl methacrylate, ethyl acrylate, ethyl ethacrylate and the like. These too may be employed in solvent solution but preferably are used in aqueous dispersion or emulsion, such as Rhoplex FRN, a 40 percent aqueous dispersion of a non-ionic acrylic acid ester polymer or Rhoplex WN-75, a 40 percent aqueous emulsion of a non-ionic acrylic polymer, manufactured by the Rohm and Haas Company. When these acrylic polymers are used in the coating composition, concentrations ranging from 5–15 percent solids are used for spraying, dipping, piece dyeing or the like while 15–25 percent by weight solids is used for roller coating or printing. For solvent solution, coal tar hydrocarbons such as benzene or toluene, esters such as ethyl acetate, cellosolve acetate or ketones such as methyl ethyl ketone may be used. Suitable plasticizers include dibutyl phthalate, dicapryl phthalate, tucresyl phosphate or dibutyl sebacate.

The following examples for the practice of this invention are given by way of illustration, but not by way of limitation:

*Composition A for piece dyeing*

4.5 percent by weight butadiene-acrylonitrile copolymer in aqueous dispersion
2.0 percent by weight pigment in aqueous dispersion (Aridye SX type)
0.1 percent dispersing agent (Blancol)
93.4 percent water

*Composition B for piece dyeing*

10.0 percent by weight ethyl acrylate polymer in aqueous dispersion
4.0 percent Malachite Green in aqueous dispersion
0.2 percent rosin soap, dispersing agent
85.8 percent water

*Composition C for protective coating*

15.0 percent by weight butadiene-acrylonitrile copolymer (Hycar OR–25) in aqueous dispersion
0.2 percent dispersing agent
84.8 percent water These coating compositions are applied to the fabric by a dip-squeeze process after the fabric has been heat treated for 3 minutes at 1050° F. to relax and weave set the fiber. The treated fabric is advanced through a drying oven at 250° F. for 10 minutes to drive off the diluent and set the colored polymer on the glass fiber surfaces. Thereafter, the fabric is submerged in a 1 percent solution of stearato-chromyl chloride and then the fabric is dried at a temperature of about 250° F. to insolubilize the lubricant on the glass fiber surfaces. When formulation A is employed, the deposited solids comprise about two percent by weight of the finished fabric. In treatments of the type described, it is best to provide for deposition of solids ranging from 1–10 percent by weight of the end products, all of which may be composed of the polymer coating in the event that color is not desired.

Composition D for screen printing 9.0 percent by weight butadiene-acrylonitrile copolymer in aqueous dispersion (Hycar OR-25)
2.5 percent by weight sodium alginate
0.2 percent dispersing agent
5.0 percent Toluidene Red
83.3 percent water

Composition E for screen printing 15.0 percent hydroxyl ethyl cellulose (high velocity)
6.0 percent butadine-acrylonitrile copolymer
0.2 percent dispersing agent
4.0 percent Methyl Violet
74.8 percent water Instead of hydroxy ethyl cellulose, carboxy methyl cellulose or methyl cellulose may be used. The paste is padded onto the cleaned glass fiber fabric in the usual manner for screen printing or in other types of printing and the treated fabric is heated at 200–350° F. for 1–10 minutes to drive off the diluent and set the color coating. The printed fabric is then treated with a 1 percent solution of stearyl ammonium chloride which is insolubilized on the glass fiber surfaces upon drying, usually in the presence of heat. Composition D represents about nine percent by weight of the finished glass fiber fabric. When printing pastes are employed, the deposited solids may exceed the amount previously set forth, but may rise to 15 or 20 percent of the finished fabric, over half of which may be the polymer or copolymer.

Referring to the drawings, Figure 1 represents a flow diagram of one form of the invention. Here a glass fiber cloth is first passed through an oven to set the weave as described and then dip coated in a tank containing one of the coating compositions. Subsequently, the cloth is dried in an oven to remove the diluent and set the coating. Thereafter, the cloth is dip coated in a solution of a water repellent and then dried in an oven to set the repellent. The finished cloth is then collected in roll form.

Figure 2 represents a flow diagram substantially like that of Figure 1 except that here the coating composition has been formulated into a suitable printing paste as previously described and is padded on the glass fiber cloth.

Figure 3 illustrates a collection of glass filaments such as in a woven relation and shows one in diametric cross-section. Such a glass filament, after being treated in accordance with the present invention, has two coverings or coatings. The first which contacts the glass surface corresponds to the color coating and the second, to the water repellent coating.

Fabrics treated in accordance with this invention have markedly improved strength and abrasion resistance even after having been washed or dry cleaned a number of times. Color embodied with the coating composition is light fast and resistant to washing or dry cleaning. Thus by the sequence of treatments in accordance with this invention, overall color or color in pattern may be applied to glass fibers in fabric form by use of equipment conventional for the textile trade.

These marked improvements in a permanently colored glass fiber fabric are accompanied with considerable improvement in softness, feel and hand. When the fibers in the fabric have been properly relaxed and weave set, the fabric is also crease-proof and wrinkle-proof. It will be understood that treatment of the type described may be carried out with individual glass fiber filaments and strands to provide a protective coating or color when the coating composition is of low viscosity such as is used for piece drying.

It will be understood that the above coating and coloring compositions may be applied to the glass fibers in forming. In this event, the application and removal of size can be eliminated and if a color coating is applied in forming, an overall color of good intensity is possible.

It will be further understood that numerous changes may be made in the formulations, their method of application and treatment without departing from the spirit of the invention, especially as defined in the following claims.

We claim:

1. The method of treating a textile fabric of glass fibers to improve the characteristics thereof comprising the steps of coating the glass fibers in the textile fabric and free of any size with a composition in which the resinous solids consist essentially of a butadiene-acrylonitrile copolymer, heating the coated fibers to drive off the diluent and set the copolymer on the glass fiber surfaces, coating the coated fibers with a dilute solution of a Werner complex compound in which the acido group has more than 10 carbon atoms, drying the fibers to drive off the diluent and insolubilize the Werner complex compound on the surfaces of the coated fibers.

2. In the method of treating a textile fabric of glass fibers to improve the characteristics thereof, the steps of coating the glass fibers in the textile fabric and from which all previous size has been removed with a composition in which the resinous solids consist essentially of a butadiene-acrylonitrile copolymer, heating the coated fibers to drive off the diluent of the composition and set the copolymer on the glass fiber surfaces, coating the fibers in the textile fabric with a dilute solution of a water repellent selected from the group consisting of a Werner complex compound in which the acido group has more than 10 carbon atoms and a cationic amine compound having an organic group attached directly to the basic nitrogen atom containing more than 10 carbon atoms, and drying the fibers to set the water repellent on the surfaces of the butadiene-acrylonitrile coated fibers.

3. The method as claimed in claim 2 in which the water repellent consists of a cationic amine compound having an organic group attached directly to the basic nitrogen atom containing more than 10 carbon atoms.

4. The method as claimed in claim 2 in which the composition applied as a coating on the glass fibers contains a coloring pigment in amounts ranging from 1–20 percent by weight of the composition.

5. In the method of treating a textile fabric of glass fibers to improve the characteristics thereof, the steps of heating the textile fabric of glass fibers at an elevated temperature for a time sufficient cleanly to burn off any size on the glass fiber surfaces, coating the heat treated textile fabric of glass fibers with a composition in which the resinous solids consist essentially of a butadiene-acrylonitrile copolymer, heating the coated fibers to drive off the diluent of the composition and set the copolymer on the glass fiber surfaces, coating the butadiene-acrylonitrile coated fibers with a dilute solution of a water repellent selected from the group consisting of a Werner complex compound in which the acido group has more than 10 carbon atoms and a cationic amine compound having an organic group attached directly to the basic nitrogen atom containing more than 10 carbon atoms, and drying the fibers to set the water repellent on the butadiene-acrylonitrile coated glass fibers.

6. In the method of treating a textile fabric of glass fibers to improve the characteristics thereof, the steps of heating the textile fabric of glass fibers at a temperature and for a time sufficient cleanly to burn off the size on the glass fiber surfaces and to weave set and relax the glass fibers in the textile fabric, coating the heat treated glass fibers in the textile fabric with a composition in which the resinous solids consist essentially of a butadiene-acrylonitrile copolymer, heating the coated fibers to drive off the diluent of the composition and set the copolymer on the glass fiber surfaces, and coating the fibers of the textile fabric with a water repellent selected from the group consisting of a Werner complex compound in which the acido group has more than 10 carbon atoms and a cationic amine compound having an organic group attached directly to the basic nitrogen atom containing more than 10 carbon atoms.

7. In the method of treating a textile fabric of glass fibers to improve the characteristics thereof, the steps of heating the textile fabric of glass fibers at a temperature within the range of 900–1250° F. for from one second to 30 minutes until the size is completely burned off of the glass fiber surfaces and the glass fibers become weave set and relaxed in the textile fabric, coating the heat cleaned glass fibers in the textile fabric with a film forming material consisting essentially of a butadiene-acrylonitrile copolymer, heating the coated fibers to set the copolymer on the glass fiber surfaces, and coating the glass fibers with a water repellent selected from the group consisting of a Werner complex compound in which the acido group has more than 10 carbon atoms and a cationic amine compound having an organic group attached directly to the basic nitrogen atom containing more than 10 carbon atoms.

8. The method as claimed in claim 6 in which the butadiene-acrylonitrile coating composition contains coloring pigments in the ratio of 1–20 parts by weight of pigment to 2–25 parts by weight of the copolymer.

9. A textile fabric of glass fibers and a coating on the surfaces of the glass fibers in the fabric consisting essentially of a butadiene-acrylonitrile copolymer in surface contact directly with the glass fiber surfaces, and a water repellent on the coated glass fibers in which the water repellent is selected from the group consisting of a Werner complex compound in which the acido group has more than 10 carbon atoms and a cationic amine compound having an organic group attached directly to the basic nitrogen atom containing more than 10 carbon atoms.

10. A textile fabric of glass fibers as claimed in claim 9 in which the water repellent comprises a Werner complex compound in which the acido group coordinated with the trivalent nuclear chromium atom has more than 10 carbon atoms.

11. A textile fabric as claimed in claim 9 in which the coating on the glass fiber surfaces contains a coloring pigment in the ratio of 1–20 parts by weight of the pigment to 2–25 parts by weight of the butadiene-acrylonitrile copolymer.

12. A textile fabric as claimed in claim 9 in which the glass fibers are weave set and relaxed by heat treatment of the textile fabric prior to the application of the butadiene-acrylonitrile copolymer.

References Cited in the file of this patent

UNITED STATES PATENTS

| Number | Name | Date |
|---|---|---|
| 2,273,040 | Iler | Feb. 17, 1942 |
| 2,335,321 | Szegvari | Nov. 30, 1943 |
| 2,356,542 | Sloan | Aug. 22, 1944 |
| 2,368,948 | Stallings | Feb. 6, 1945 |
| 2,394,542 | Gans | Feb. 12, 1946 |
| 2,504,124 | Hicks | Apr. 18, 1950 |
| 2,504,136 | Lee | Apr. 18, 1950 |
| 2,511,113 | LaPiana | June 13, 1950 |
| 2,584,763 | Waggoner | Feb. 5, 1952 |
| 2,593,817 | Waggoner | Apr. 22, 1952 |